(12) United States Patent
Li et al.

(10) Patent No.: US 12,523,194 B2
(45) Date of Patent: Jan. 13, 2026

(54) HYDROPOWER RECYCLE SYSTEM

(71) Applicant: Green Vigor Limited, Shatin (HK)

(72) Inventors: Pak Ngai Li, Ma On Shan (HK); Hei Yue Chong, Hong Kong (HK)

(73) Assignee: GREEN VIGOR LIMITED, Shatin (HK)

( * ) Notice: Subject to any disclaimer, the term of this patent is extended or adjusted under 35 U.S.C. 154(b) by 0 days.

(21) Appl. No.: 18/728,761

(22) PCT Filed: Jan. 9, 2023

(86) PCT No.: PCT/CN2023/071299
§ 371 (c)(1),
(2) Date: Jul. 12, 2024

(87) PCT Pub. No.: WO2023/134621
PCT Pub. Date: Jul. 20, 2023

(65) Prior Publication Data
US 2025/0101938 A1 Mar. 27, 2025

(30) Foreign Application Priority Data
Jan. 13, 2022 (CN) .......................... 202210038117.3

(51) Int. Cl.
F03B 1/04 (2006.01)
F03B 13/00 (2006.01)
(52) U.S. Cl.
CPC ................ F03B 1/04 (2013.01); F03B 13/00 (2013.01); F05B 2220/32 (2013.01); F05B 2240/241 (2013.01)

(58) Field of Classification Search
CPC .... F03B 1/00; F03B 1/04; F03B 13/00; F05B 2240/241; F05B 2240/2411;
(Continued)

(56) References Cited
U.S. PATENT DOCUMENTS
1,654,889 A * 1/1928 Kniskern .................. F03B 1/00
261/37

FOREIGN PATENT DOCUMENTS
CN 101029620 A * 9/2007
CN 217176783 U * 8/2022 ................ F03B 1/00
(Continued)

OTHER PUBLICATIONS
International Search Report from International Patent Application No. PCT/CN2023/071299 dated Feb. 15, 2023.

Primary Examiner — Courtney D Heinle
Assistant Examiner — Ryan C Clark
(74) Attorney, Agent, or Firm — Budzyn IP Law, LLC

(57) ABSTRACT
A system, relating to the technical field of hydroelectric power generation, is provided which includes a turbine device, a power generating device and a rooftop water tank. A water inlet is provided at the top of the rooftop water tank. The turbine device includes a turbine housing provided above the water inlet with a water outlet being provided at the bottom of the turbine housing. A turbine is provided inside the turbine housing with a turbine rotating shaft passing through the turbine housing. One end of the turbine rotating shaft is transmittingly connected to an input shaft of the power generating device. A high-pressure nozzle is fixedly disposed on a sidewall of the turbine housing.

6 Claims, 8 Drawing Sheets

(58) Field of Classification Search
CPC ........ F05B 2240/131; F05B 2240/9112; F05B 2240/911; F05B 2240/91; F05B 2260/422
See application file for complete search history.

(56) References Cited

FOREIGN PATENT DOCUMENTS

| | | | | |
|---|---|---|---|---|
| DE | 102011102506 | A1 * | 11/2012 | ................ F03B 1/00 |
| FR | 2789126 | A1 * | 8/2000 | .............. F03B 13/00 |
| JP | 2010229933 | A * | 10/2010 | |
| JP | 2012225341 | A * | 11/2012 | |
| JP | 2014141905 | A * | 8/2014 | |
| NL | 1038205 | C2 * | 2/2012 | |
| WO | WO-2021125935 | A1 * | 6/2021 | .............. F03B 13/00 |

* cited by examiner

HYDROPOWER RECYCLE SYSTEM

CROSS-REFERENCE TO RELATED APPLICATIONS

This Application is a National Stage Application under 35 U.S.C. § 371 of PCT Application No. PCT/CN2023/071299, filed Jan. 9, 2023, which claims priority to Chinese Patent Application No. 202210038117.3, filed Jan. 13, 2022, the entire contents of which are incorporated by reference herein.

TECHNICAL FIELD

The present disclosure relates to the technical field of hydroelectric power generation, and more specifically to a hydropower recycle system.

BACKGROUND ART

The hydroelectric power generation technology in the prior art is mostly applied in the area of large dams or energy-storage hydroelectric power generation. These projects require a geographic fit and a large amount of water, as well as billions or tens of billions of dollars in capital investment, take a long time for the construction, and have a significant impact on the surrounding environment. Such projects are intended to solve the power supply needs of provincial-level cities, and are not applicable to urban hydroelectricity generation.

Most cities have countless high-rise buildings with a large number of people living therein. Every year, every month and every day, a large amount of potable water and seawater is transported to the residential units inside the buildings to supply the residents with water for their use, such as the water for toilet flushing, taking a bath, potable water, cooking, and so on. In the transportation process of water for residential use, as most of the city residents live in the high-rise buildings, the water for drinking and toilet flushing is usually first transported to the underground tanks located in the building; when the building is higher than eight floors, it is necessary to use a water pump to transport water to the rooftop water tanks of the building, and then transport water from the rooftop water tanks from the top down to different floors of the building. High-rise buildings are usually provided with depressurization tanks in the designated floors. The reason is that when the water is transported all the way down to lower floors, the water pressure will keep increasing, and there will be too much water pressure in case of no depressurization, resulting in bursting of pipes and so on. Nowadays, high-rise buildings in the city do not have energy recycle devices, and the water is directly sent to the rooftop and then distributed to the residents on each floor, resulting in a great waste of potential energy.

SUMMARY OF THE INVENTION

A main object of the present disclosure is to provide a hydropower recycle system to solve the problems in the prior art.

To solve the above technical problems, the present disclosure employs the following technical solutions:

a hydropower recycle system, including a turbine device, a power generating device and a rooftop water tank, wherein the turbine device and the power generating device are both provided on the top of the rooftop water tank, and a water inlet is provided on the top of the rooftop water tank, the turbine device includes a turbine housing, a turbine, a high-pressure nozzle and a turbine rotating shaft, wherein the turbine housing is provided above the water inlet, a water outlet is provided at the bottom of the turbine housing and the outlet is communicated with the water inlet, the turbine is provided inside the turbine housing, the turbine rotating shaft passes through the turbine housing, a part of the turbine rotating shaft located in the turbine housing is connected with the turbine, one end of the turbine rotating shaft extending out of the turbine housing is transmittingly connected to an input shaft of the power generating device, the high-pressure nozzle is fixedly provided on a sidewall of the turbine housing, with one end being communicated with an external intake pipe, and the other end passing through the sidewall of the turbine housing to the inside of the turbine housing and being aligned with the turbine.

Further, the turbine includes a turbine body and turbine fan blades, wherein the turbine fan blades are uniformly arranged in a circumferential direction on the outer side of the turbine body, a circular hole is provided in the center of the turbine body, and the turbine rotating shaft is interference fit with the circular hole.

Further, the number of the high-pressure nozzle is two, i.e., a first high-pressure nozzle and a second high-pressure nozzle, wherein the first high-pressure nozzle and the second high-pressure nozzle are disposed opposite to each other on both sides of the turbine housing.

Further, the first high-pressure nozzle is provided at the bottom of the turbine housing for aligned jetting the bottom of the turbine fan blades, and the second high-pressure nozzle is provided at the top of the turbine housing for aligned jetting the top of the turbine fan blades.

Further, the hydropower recycle system further includes a plumbing device, the plumbing device including a first water pipe, a second water pipe and a third water pipe, wherein the second water pipe is provided between the first water pipe and the third water pipe, a first water valve is provided between the second water pipe and the first water pipe, a second water valve is provided between the second water pipe and the third water pipe, the second water pipe is communicated with the intake pipe, an outlet end of the first water pipe is communicated with the first high-pressure nozzle, and an outlet end of the third water pipe is communicated with the second high-pressure nozzle.

Further, the hydropower recycle system further includes a water flow safety device, the water flow safety device including a fourth water pipe and a third water valve, wherein the fourth water pipe is communicated with the second water pipe via an intake pipe at one end and is communicated with the rooftop water tank at another end, the third water valve is provided between the fourth water pipe and the second water pipe.

Further, the first water pipe and the third water pipe are pressurized water pipes, and the second water pipe and the fourth water pipe are standard water pipes.

Further, the power generating device is a generator, the rooftop water tank is provided with a fixed block at the top, and the generator is provided on the fixed block.

Further, the number of the rooftop water tank is one or two, and the number of the turbine device and the power generating device matches the number of the rooftop water tank.

Further, the number of the rooftop water tank is two, and the two rooftop water tanks are provided side by side.

Compared to the prior art, a hydropower recycle system provided by the present disclosure has the following beneficial effects:

By providing a turbine device on the rooftop water tank to recycle the potential energy, the overall structure is simple, the commitment resource is small, the installation and commissioning to formal use only requires a few weeks or months, the impact on the environment is slight, the original water supply facilities in the building will not be affected, the energy which is originally necessary to be used is recycled, the recycled energy is supplied to the building for use or is sold to the power grid, to provide green energy, reduce carbon emission, thereby producing social and economic effects.

Social effect: the neglected energy that must be used can be recycled, producing green energy, reducing carbon emission, and contributing to the achievement of carbon neutrality.

Economic effect: Installation of the hydropower recycle system in a building can generate significant revenue for the building, whether the recycled electricity is for the building's own use or for sale to the grid, it can result in savings and returns for the building, and the returns are constant and sustainable over a long period of time.

EMBODIMENTS

The technical solutions of the present disclosure are further described below by means of the accompanying drawings and embodiments.

Figure 1:
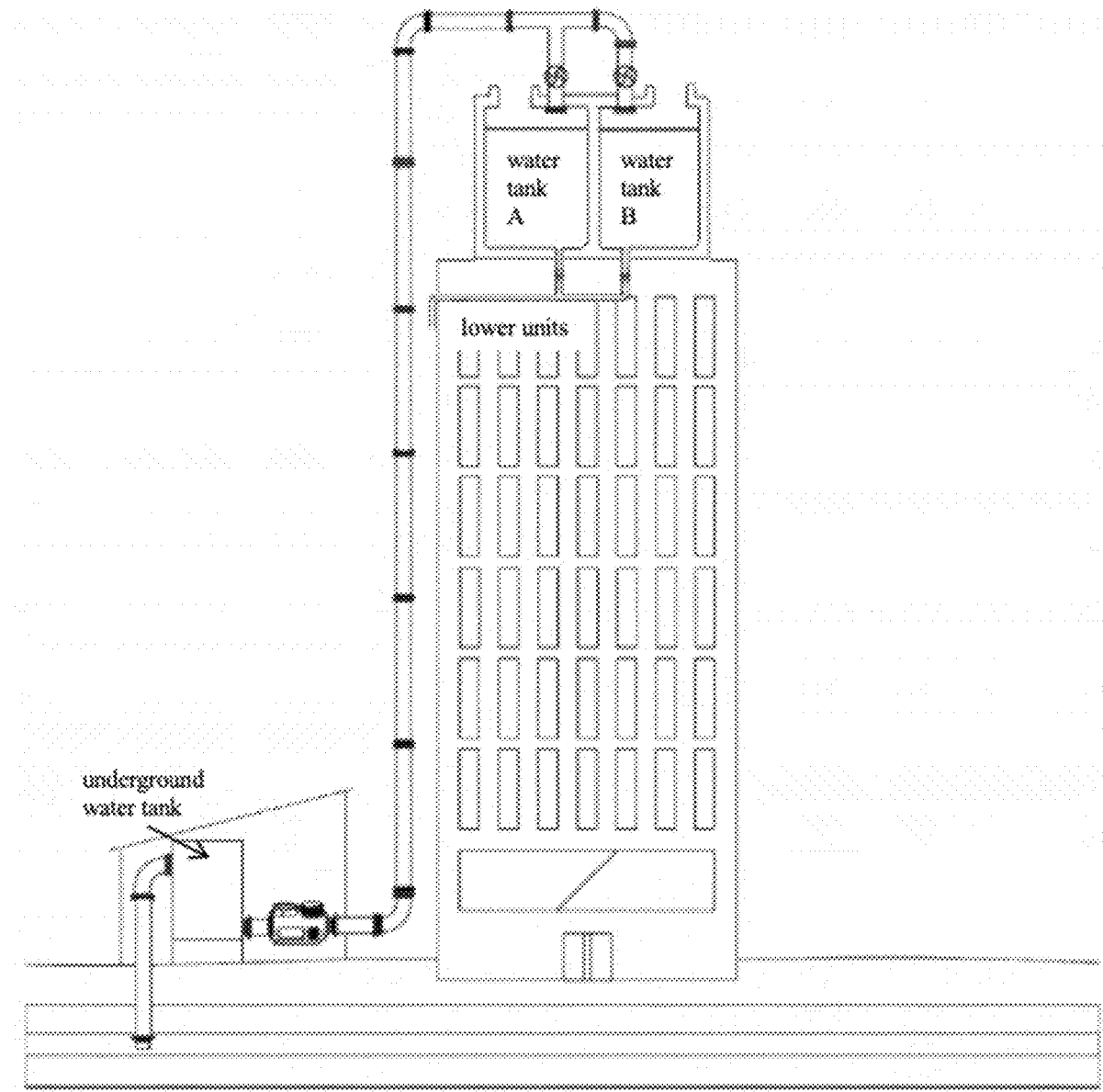
FIG. 1 is a schematic diagram of the water supply manner in a high-rise building.
Figure 2:
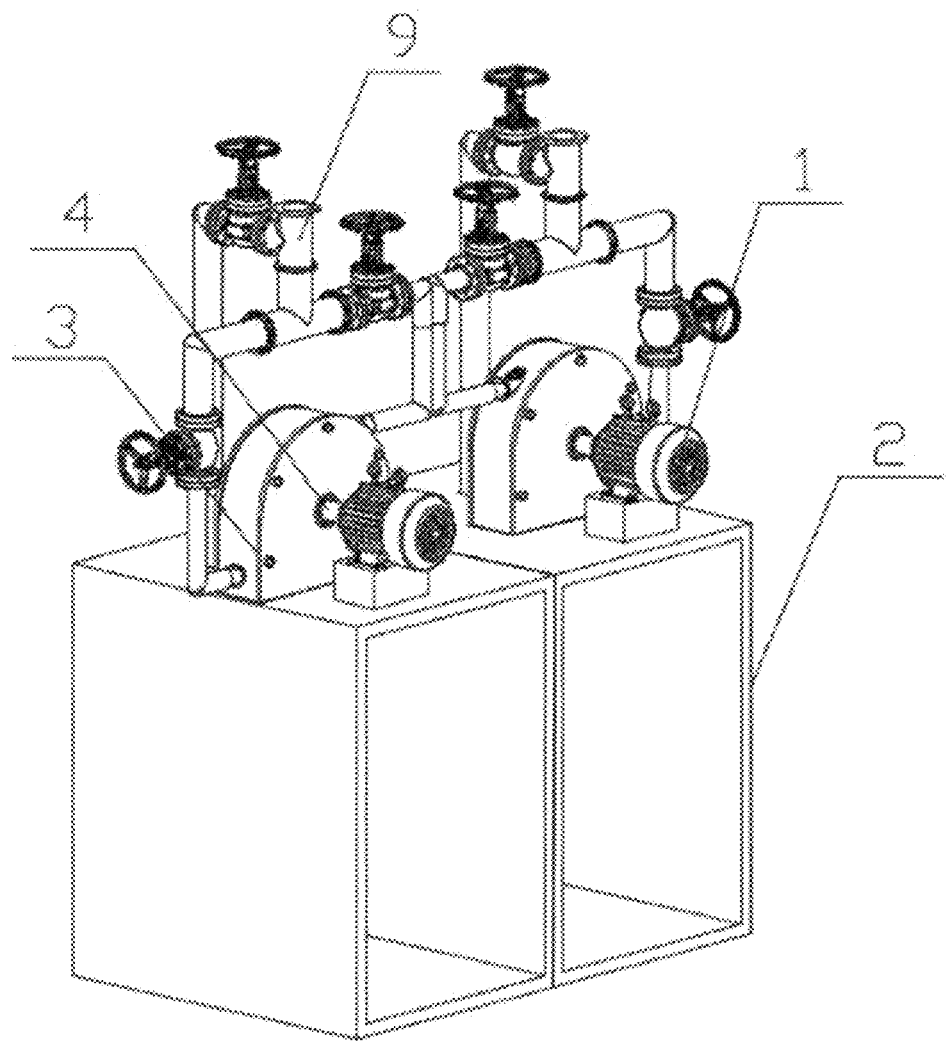
FIG. 2 is a schematic diagram of an overall structure of the present disclosure.
Figure 3:
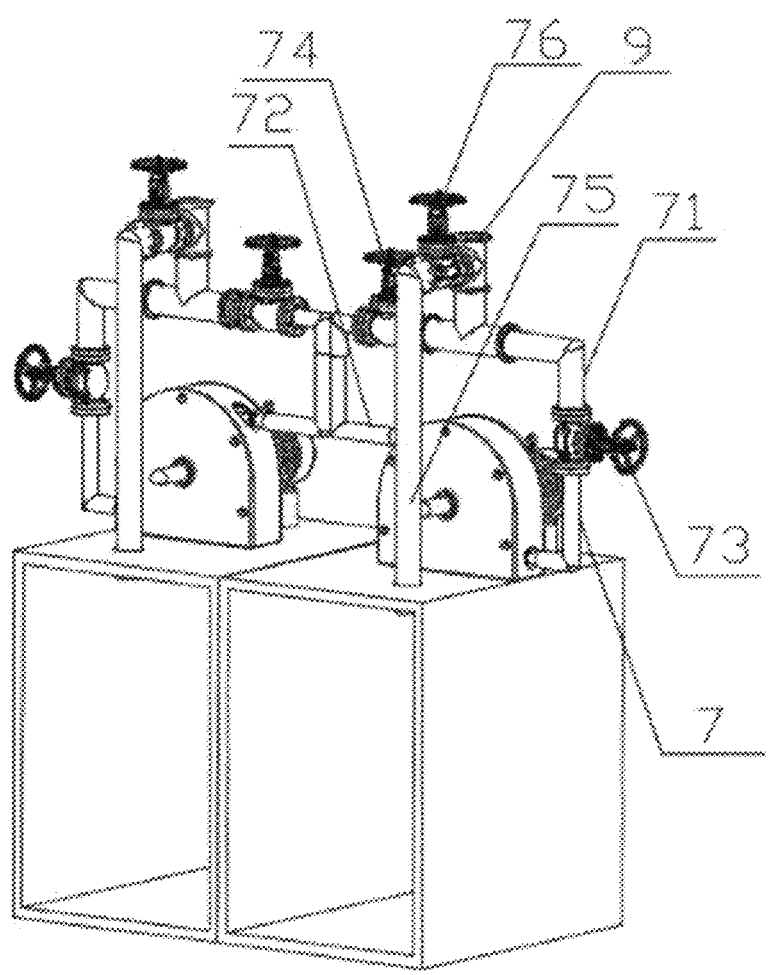
FIG. 3 is a schematic diagram of an overall structure of the present disclosure in another angle.
Figure 4:
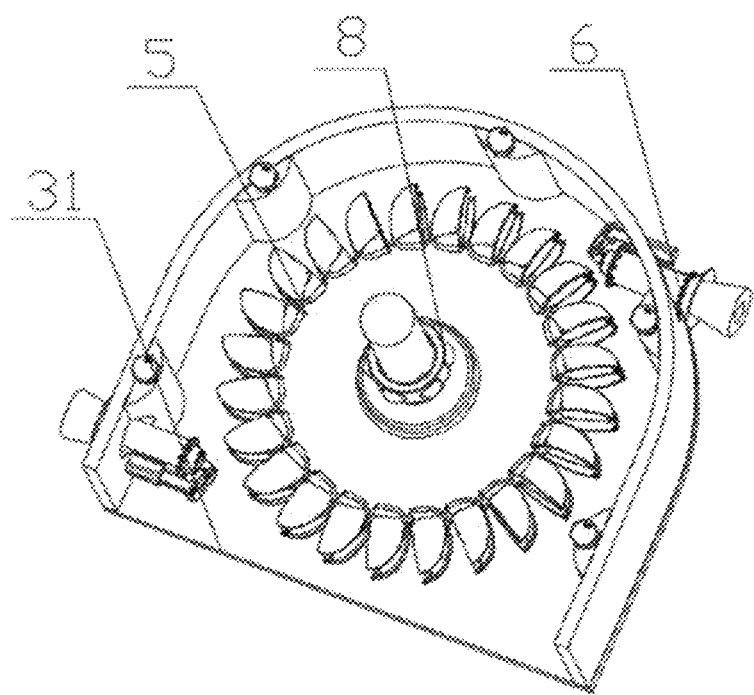
FIG. 4 is a structural schematic diagram of a turbine device of the present disclosure.
Figure 5:
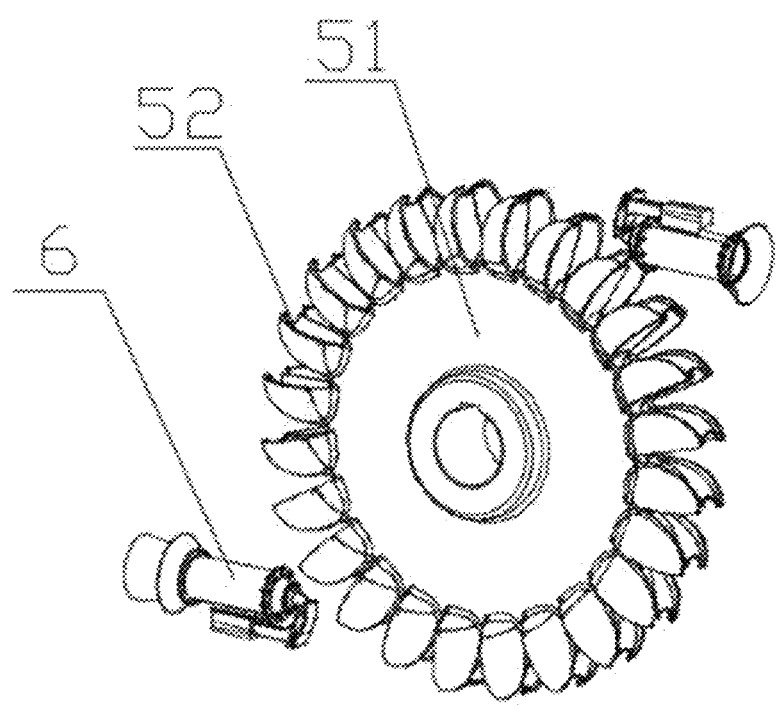
FIG. 5 is a structural schematic diagram of the turbine and a high-pressure nozzle of the present disclosure.
Figure 6:
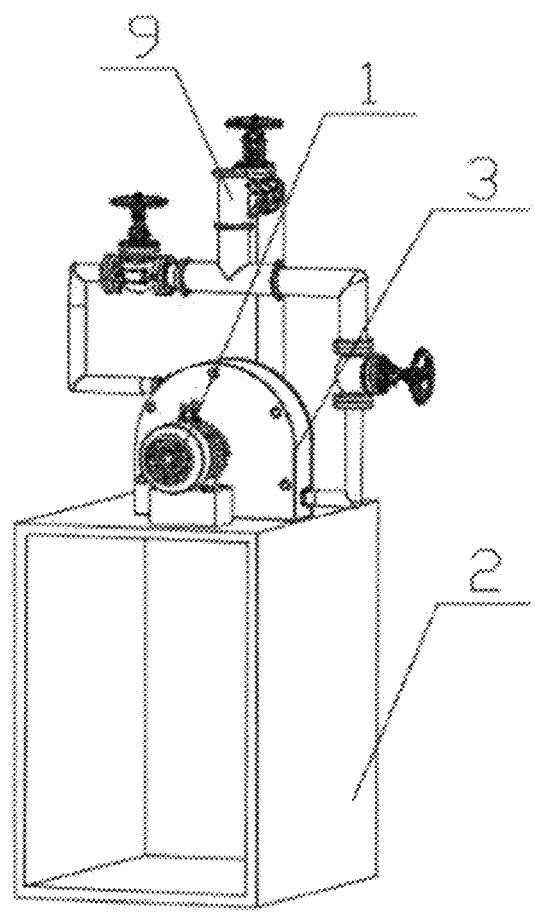
FIG. 6 is a structural schematic diagram of a single rooftop water tank of the present disclosure.
Figure 7:
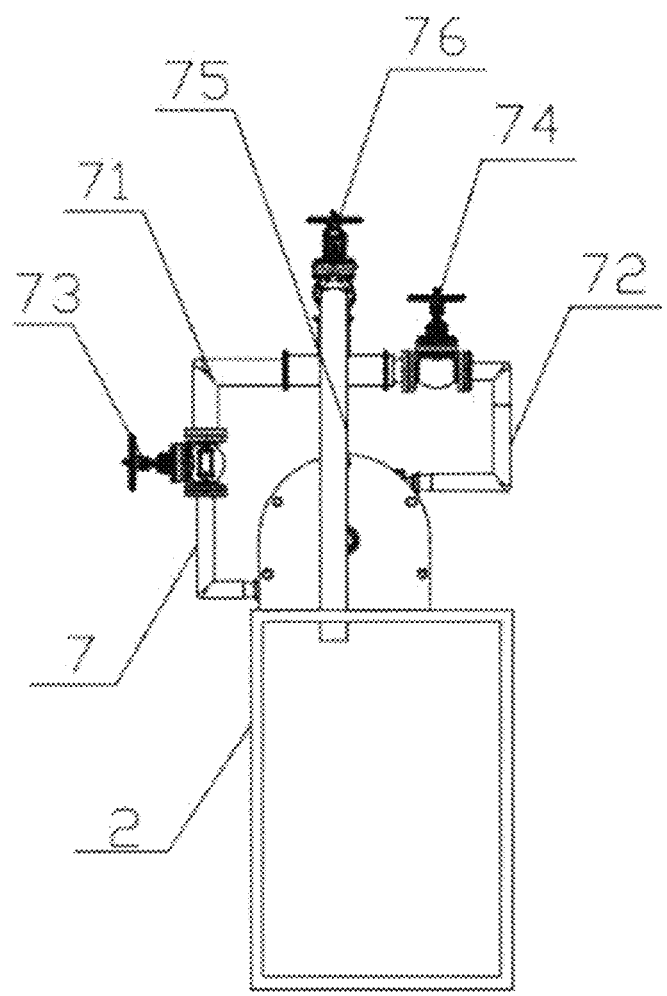
FIG. 7 is a rear view of a single rooftop water tank of the present disclosure.
Figure 8:
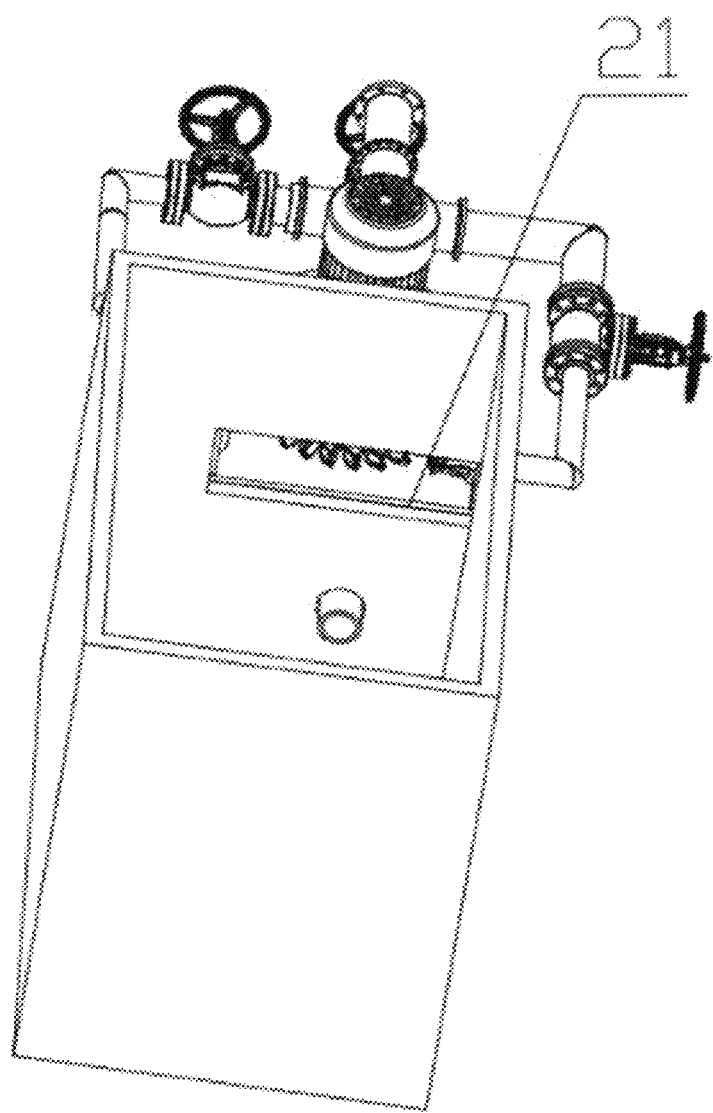
FIG. 8 is a structural schematic diagram of the inside of rooftop water tank of the present disclosure, wherein, 1—generator, 2—rooftop water tank, 21—water inlet, 3—turbine housing, 31—hood cover plate, 4—turbine rotating shaft, 5—turbine, 51—turbine body, 52—turbine fan blade, 6—high-pressure nozzle, 7—first water pipe, 71—second water pipe, 72—third water pipe, 73—first water valve, 74—second water valve, 75—fourth water pipe, 76—third water valve, 8—turbine bearing, 9—intake pipe.

Referring to FIGS. 1 to 8, the present disclosure provides a hydropower recycle system, including a turbine device, a power generating device and a rooftop water tank 2. The turbine device and the power generating device are each provided at the top of the rooftop water tank 2. The turbine device is connected with the power generating device via a turbine rotating shaft 4. A water inlet 21 is provided at the top of the rooftop water tank 2. The power generating device is a generator 1. The turbine device includes a turbine housing 3, a turbine 5 and a high-pressure nozzle 6. The turbine housing 3 is provided above the water inlet 21. A water outlet is provided at the bottom of the turbine housing 3, and the water outlet is communicated with the water inlet 21. The turbine 5 is provided inside the turbine housing 3. The turbine rotating shaft 4 passes through the turbine housing 3. The turbine 5 is fixedly provided on the outer side of the turbine rotating shaft 4. The high-pressure nozzle 6 is fixedly provided on a sidewall of the turbine housing 3, with one end being communicated with an external intake pipe, and the other end extending through the sidewall of the turbine housing 3 to the inside of the turbine housing 3 and being aligned with the turbine 5.

In this embodiment, the water for drinking or toilet flushing is transported by a water pump from the underground water tank to the rooftop water tank 2. The rooftop water tank 2 is provided therein with a float device, which is a water level float. When the water level reaches a desired upper limit of water level, the float device will send a signal to stop the water pump from supplying water. When the water in the rooftop water tank 2 is delivered to a household and exhausted to a specified lower limit of water level, the float device will send a signal enabling the water pump to supply water. The turbine 5 is a Pelton turbine or a Francis turbine, installed at the water inlet 21 of the rooftop water tank 2, such that all the water flow, before entering the rooftop water tank 2, must pass through a preset turbine path to be used for pushing the turbine 5.

In an embodiment, the turbine 5 includes a turbine body 51 and turbine fan blades 52. The turbine fan blades 52 are uniformly arranged in a circumferential direction on the outer side of the turbine body 51. A circular hole is provided in the center of the turbine body 51, and the turbine rotating shaft 4 is interference fit with the circular hole. When the high-pressure nozzle 6 sprays water against the turbine fan blade 52, the turbine fan blade 52 will rotate and drive the turbine body 51 to rotate. The turbine body 51 drives the turbine rotating shaft 4 to rotate, and the turbine rotating shaft 4 drives the generator 1 to rotate, generating electricity.

In an embodiment, the number of the high-pressure nozzle 6 is two, i.e., a first high-pressure nozzle and a second high-pressure nozzle. The first high-pressure nozzle and second high-pressure nozzle are provided opposite to each other. The first high-pressure nozzle is provided at the bottom of the turbine housing 3 for aligned spraying the bottom of the turbine fan blade 52, and the second high-pressure nozzle is provided at the top of the turbine housing 3 for aligned spraying the top of the turbine fan blade 52. In use, a position of the high-pressure nozzle 6 can be adjusted so that an angle of the out-flowing water, the speed and pressure of the water flow are more suitable for effectively pushing the turbine to rotate. The turbine housing 3 is provided with a water outlet only at the bottom, and the rest is fully sealed with a hood, regulating all the water passing through the turbine 5 to ensure that it all falls into the rooftop water tank 2. In this embodiment, the turbine housing 3 is comprised of a hood cover plate 31. A circular hole is provided in the hood cover plate 31, a turbine bearing 8 is provided in the circular hole, and the turbine rotating shaft 4 passes through the turbine bearing 8 on the hood cover plate 31 and is connected to the external generator 1.

In an embodiment, the hydropower recycle system further includes a plumbing device and a water flow safety device. The plumbing device includes a first water pipe 7, a second water pipe 71 and a third water pipe 72, wherein the second water pipe 71 is disposed between the first water pipe 7 and the third water pipe 72, a first water valve 73 is disposed between the second water pipe 71 and the first water pipe 7, and a second water valve 74 is disposed between the second water pipe 71 and the third water pipe 72. The second water pipe 71 is communicated with the intake pipe 9, an outlet end of the first water pipe 7 is communicated with the first high-pressure nozzle, and an outlet end of the third water pipe 72 is communicated with the second high-pressure nozzle.

The water flow safety device includes a fourth water pipe 75 and a third water valve 76, wherein the fourth water pipe 75 is communicated with the second water pipe 71 via the intake pipe 9 at one end and is communicated with the rooftop water tank 2 at another end, the third water valve 76 is provided between the fourth water pipe 75 and the second water pipe 71.

When the power generation is required, the first water valve 73 and the second water valve 74 are adjusted to an open state, and the third water valve 76 is adjusted to a closed state. The water is drawn by a water pump from the underground to the rooftop intake pipe 9, then flows through the second water pipe 71 and enters through the first water valve 73. Thereafter, the water flow moves downwardly through the first water pipe 7 to the first high-pressure nozzle, jet driving the bottom of the turbine fan blade 52. The water flow from the intake pipe 9 also flows through the second water valve 74 to the third water pipe 72, and the water from the third water pipe 72 flows to the second high-pressure nozzle, jet driving the top of the turbine fan blade 52.

When the maintenance for the turbine device is required, the third water valve 76 is adjusted to an open state, and the first water valve 73 and the second water valve 74 are adjusted to a closed state. At this point, the water will not pass through the turbine housing 3, but will flow through the third water valve 76 directly into the rooftop water tank 2 through the fourth water pipe 75, which will not affect the water supply and normal use.

In this embodiment, the first water pipe 7 and the third water pipe 72 are pressurized water pipes, while the second water pipe 71 and the fourth water pipe 75 are standard water pipes. The first water valve 73, the second water valve 74 and the third water valve 76 are all manual water valves. In another embodiment, motorized water valves may be used, which are all controlled by a system computer.

In an embodiment, the rooftop water tank 2 is provided with a fixed block at the top, and the generator 1 is provided on the fixed block. The generator 1 generally has an initial requirement for a power of 20 KW. The generator 1 can be directly connected to the turbine, or can be connected to a gear housing to amplify a rotational speed of the turbine 5. In use, the rotational speed and force that the water flow can give to the turbine 5 are analyzed, and subsequently the method of connecting the generator 1 is determined, so as to achieve the highest benefit in terms of power generation capacity.

In this embodiment, the number of the rooftop water tank 2 is one or two, and the number of the turbine device and the power generating device matches the number of the rooftop water tank 2. In a double water tank design, two rooftop water tanks 2 are provided side by side. In the case of a double water tank design, the turbine tank 3 includes a turbine tank A and a turbine tank B, and the generator 1 includes a generator A and a generator B. Without affecting the water supply, the water intake pressure, the water flow rate and the water flow are controlled, so as to achieve the most effective pushing of the turbine 5, thereby increasing the efficiency of recycling energy to enable the turbine to run for the longest possible duration. It can also be equipped with and develop an intelligent control system, which utilizes a computer to intelligently control the required water flow and pressure to enhance the power generation efficiency.

DC power produced by the generator 1 is processed by a controller and sent to a preset energy storage battery. It can also be reversed to AC power for use, or be transmitted to the power grid through a meter. The controller can receive power production data, analysis and alerts from the controller via the Internet from a cellphone or a computer, and can also send real-time commands to the controller via the Internet to respond to unexpected needs.

Principle of workflow: the water flow delivered by an underground water pump to the rooftop water tank, before entering the rooftop water tank, needs to first pass through the turbine device; the water flows through the plumbing device to the inside of the turbine housing, and sprays against the turbine fan blade from the high-pressure nozzle; the water flow is in a pressurized state; the high-pressure nozzles are facing the turbine; the water flow drives the turbine fan blade to rotate and brings about rotation of the turbine body; the turbine body drives the turbine rotating shaft to rotate, and the turbine rotating shaft drives the generator to rotate, generating electricity to produce the electric energy, so that the kinetic energy of the water transported to the rooftop water tank can be recycled before entering the tank, and the electric energy can be stored in the energy-storage battery through a controller or can be output to the grid through a power meter and security system.

The above is only a preferable embodiment of the present disclosure, but not a limitation on the technical scope of the present disclosure. Therefore, any minor modifications, equivalent changes and modifications made to the above embodiments based on the technical substance of the present disclosure are still within the scope of the technical solutions of the present disclosure.

The invention claimed is:

1. A hydropower recycle system, comprising an intake pipe, a turbine device, a plumbing device, a power generating device and a rooftop water tank, wherein the turbine device and the power generating device are both provided on the top of the rooftop water tank, and a water inlet is provided on the top of the rooftop water tank, the intake pipe being connected to an external source of water the plumbing device comprises a first water pipe, a second water pipe and a third water pipe, wherein the second water pipe is provided between the first water pipe and the third water pipe, a first water valve is provided between the second water pipe and the first water pipe, a second water valve is provided between the second water pipe and the third water pipe, wherein the second water pipe is communicated with the intake pipe, the turbine device comprises a turbine housing, a turbine, a first high-pressure nozzle, a second high-pressure nozzle and a turbine rotating shaft, wherein the turbine housing is provided above the water inlet, a water outlet is provided at the bottom of the turbine housing and the water outlet is communicated with the water inlet, the turbine is provided inside the turbine housing, the turbine rotating shaft passes through the turbine housing, a part of the turbine rotating shaft located in the turbine housing is connected with the turbine, the turbine rotating shaft extends out of the turbine housing to be transmittingly connected to an input shaft of the power generating device, the first high-pressure nozzle and the second high-pressure nozzle are fixedly provided on a sidewall of the turbine housing, wherein the first high-pressure nozzle includes first and second nozzle ends with the first nozzle end being communicated with the first water pipe and the second nozzle end located inside the turbine housing aligned with the turbine, and wherein the second high-pressure nozzle includes first and second secondary nozzle ends with the first secondary nozzle end being communicated with the third water pipe and the second secondary nozzle end located inside the turbine housing aligned with the turbine, wherein the turbine comprises a turbine body and turbine fan blades, wherein the turbine fan blades are uniformly arranged in a circumferential direction on the outer side of the turbine body, a circular hole is provided in the center of the turbine body, and the turbine rotating shaft is interference fit with the circular hole, wherein the first high-pressure nozzle and the second high-pressure nozzle are disposed opposite to each other on both sides of the turbine housing, wherein the first high-pressure nozzle is provided at the bottom of the turbine housing for aligned jetting the bottom of the turbine fan blades, and the second high-pressure nozzle is provided at the top of the turbine housing for aligned jetting the top of the turbine fan blades.

2. The hydropower recycle system as claimed in claim 1, further comprising a water flow safety device, the water flow safety device comprising a fourth water pipe and a third water valve, wherein the fourth water pipe is communicated with the second water pipe via the intake pipe and is communicated with the rooftop tank, the third water valve is provided between the fourth water pipe and the second water pipe.

3. The hydropower recycle system as claimed in claim 2, wherein the first water pipe and the third water pipe are pressurized water pipes, and the second water pipe and the fourth water pipe are standard water pipes.

4. The hydropower recycle system as claimed in claim 1, wherein the power generating device is a generator, the rooftop water tank is provided with a fixed block at the top, and the generator is provided on the fixed block.

5. A system comprising a plurality of hydropower recycle systems each configured as the hydropower recycle system set forth in claim 1.

6. The system as claimed in claim 5, wherein the plurality of the hydropower recycle systems are arranged in parallel.

* * * * *